L. D. PEARCE.
SAFETY HOOK.
APPLICATION FILED MAY 22, 1914.

1,144,377.

Patented June 29, 1915.

Witnesses
E. R. Rupput.
F. H. Hoster

Inventor
L. D. Pearce
By Victor J. Evans
Attorney

UNITED STATES PATENT OFFICE.

LEON D. PEARCE, OF PHELPS, NEW YORK.

SAFETY-HOOK.

1,144,377.  Specification of Letters Patent.  Patented June 29, 1915.

Application filed May 22, 1914. Serial No. 840,258.

*To all whom it may concern:*

Be it known that I, LEON D. PEARCE, a citizen of the United States, residing at Phelps, in the county of Ontario and State of New York, have invented new and useful Improvements in Safety-Hooks, of which the following is a specification.

An object of the invention is to provide a safety hook which is particularly adapted for use in connecting watches and chains or for use as a key ring.

The invention contemplates, among other features, the provision of a hook which consists of a swinging link or hook member carried on a suitable body and adapted to have its free end secured in locked engagement with the body in a socket thereof by a suitable sliding locking member.

Figure 1:
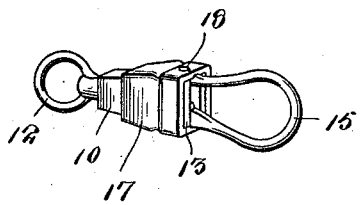
Figure 2:
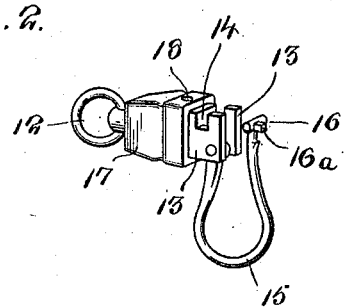
Figure 3:
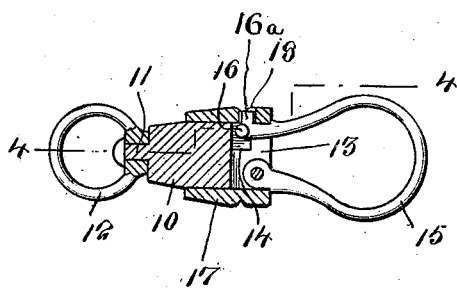
Figure 4:
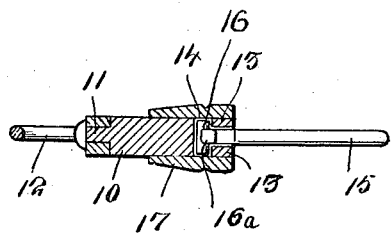

In the further disclosure of the invention reference is to be had to the accompanying drawings, constituting a part of this specification, in which similar characters of reference denote corresponding parts in all the views, and in which:

Figure 1 is a perspective view of the safety hook, showing the hook member closed and locked; Fig. 2 is a perspective view of a safety hook, showing the hook member opened and unlocked; Fig. 3 is a vertical longitudinal sectional view of the hook; and Fig. 4 is a horizontal sectional view taken on the line 4—4 in Fig. 3.

Referring more particularly to the views, I provide a body 10 formed to provide a reduced shank 11 at one end thereof on which is swiveled and arranged to turn a ring or connecting member 12 preferably adapted for connecting a chain thereto. The other end of the body 10 is bifurcated to provide a plurality of spaced similar members 13 in each of which is formed a U-shaped slot 14. Pivotally mounted between the members 13 is a hook member 15 terminating at its free end in a T-shaped head 16, the ends of which are adapted to be received in the slots 14 when the hook member is swung into closed position. The hook member 15 is preferably made of a spring-like material so that when the hook member is swung longitudinally of the body to a closed position it is necessary to press the head 16 in the slot, whereas when the hook member is swung to an open position the free end of the hook member will be spaced from the body so that the ring of a watch can be engaged with the hook member and received therein or suitable keys can be placed upon the hook member if desired.

Mounted to slide on the body 10 is a locking member 17 preferably in the nature of a band provided with an opening 18, the rearward movement of the said locking member on the body being limited by the ring member 12 and the forward movement of the locking member on the body being limited by the inner end of the hook member 15.

Assuming that the hook member is in open position, after the watch or keys have been connected therewith and arranged upon the former, the same is swung longitudinally of the body so that the T-shaped head 16 lies immediately adjacent to the slots 14. The T-shaped head is now pressed into the slot and the locking member is then advanced on the body portion 10 over the said slots 14, the T-shaped head 16 and its projection 16ª, thus permitting said projection 16ª to spring into the opening 18 in the locking member thereby locking the member against movement of the body and holding the hook member in locked position on the body so that the articles on the hook member can not be removed therefrom.

From the foregoing description it will be seen that the device consists essentially of the body, the hook member, the locking member and, if desirable, the swiveled ring or connecting member for attaching the device to a chain and which, when used, constitutes a means for limiting the sliding movement of the locking member on the body.

Having thus described my invention, I claim:

1. A device of the class described, a body portion bifurcated at one end to provide a pair of spaced members each having formed in the side edge thereof a U-shaped slot, a member pivotally mounted between the spaced members, a T-shaped head formed on the free end of said member and adapted to be seated in the U-shaped slots upon the swinging of said member to a closed position, a projection on said head, and an apertured member slidably mounted on said body portion and adapted for movement over said slots, whereby its aperture will receive the projection of said head for locking the pivotally mounted member.

2. In a device of the character described, the combination with a body bifurcated at one end to provide a pair of members each having formed in the side edge thereof a U-shaped slot, of a spring like hook member pivotally mounted between said spaced members, a T-shaped head on the free end of the hook member and adapted to enter the U-shaped slots, a projection on said head, and an apertured member slidably mounted upon the body and adapted to be moved over the said head and slots, whereby the projection of the head will enter the aperture of said slidably mounted member and secure the hook member against movement thereon.

In testimony whereof I affix my signature in presence of two witnesses.

LEON D. PEARCE.

Witnesses:
WILLIAM W. PEARCE,
CHAS. H. GARLOCK.

Copies of this patent may be obtained for five cents each, by addressing the "Commissioner of Patents, Washington, D. C."